Aug. 22, 1944.　　　T. A. RICH　　　2,356,616
PEAK DEMAND METER
Filed July 15, 1942　　　3 Sheets-Sheet 1
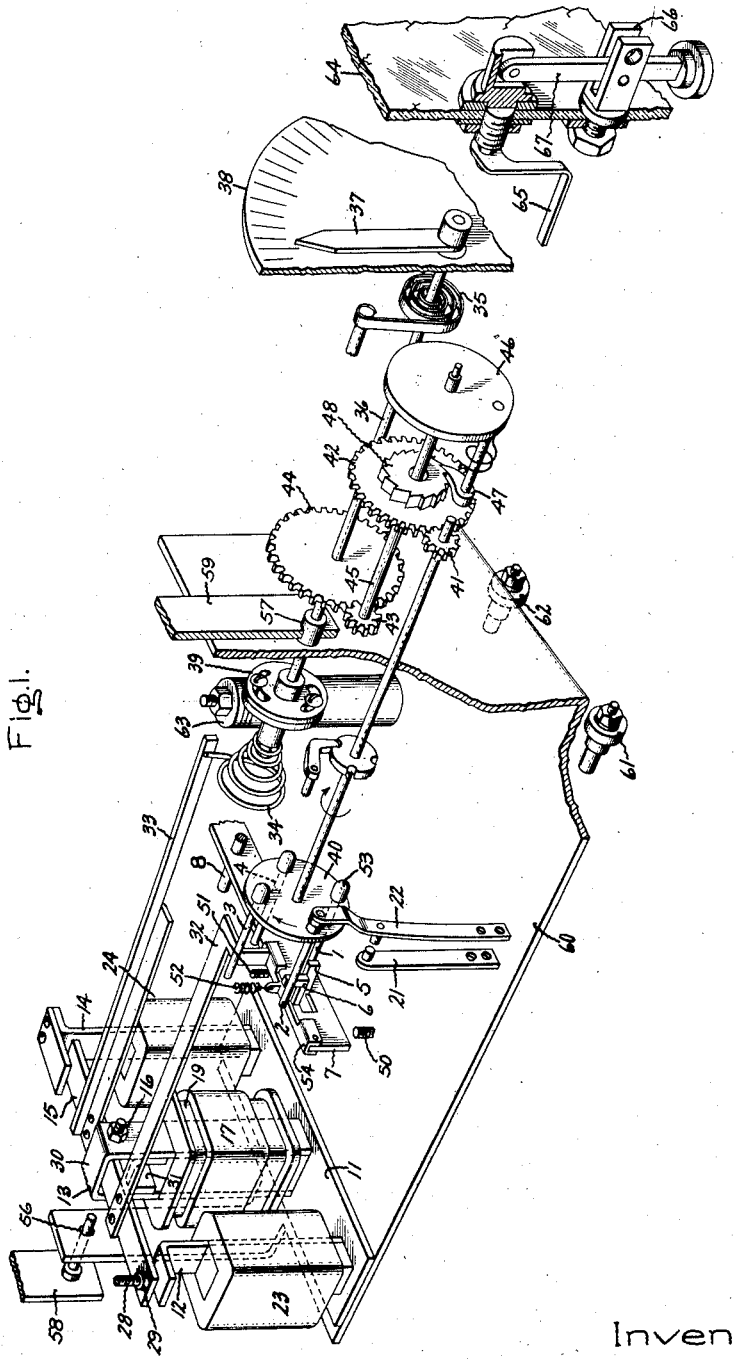
Inventor:
Theodore A. Rich,
by Harry E. Dunham
His Attorney.

Aug. 22, 1944.  T. A. RICH  2,356,616
PEAK DEMAND METER
Filed July 15, 1942  3 Sheets-Sheet 2
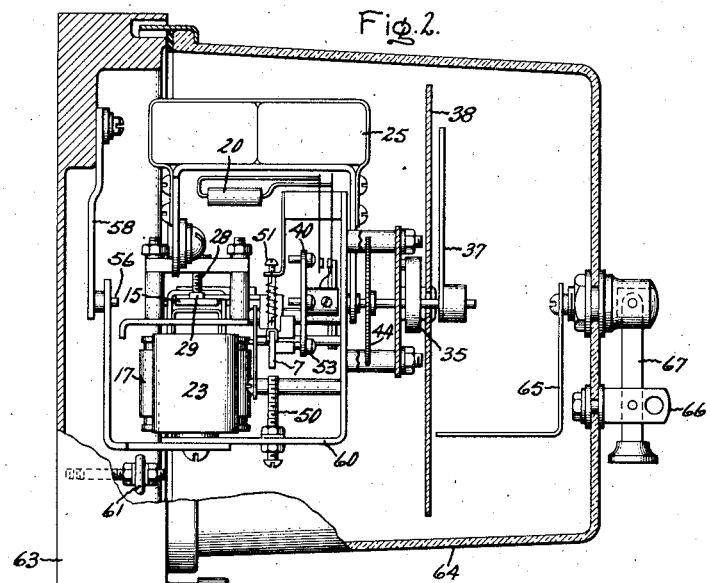
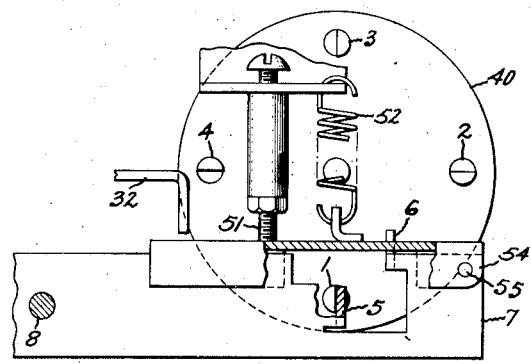
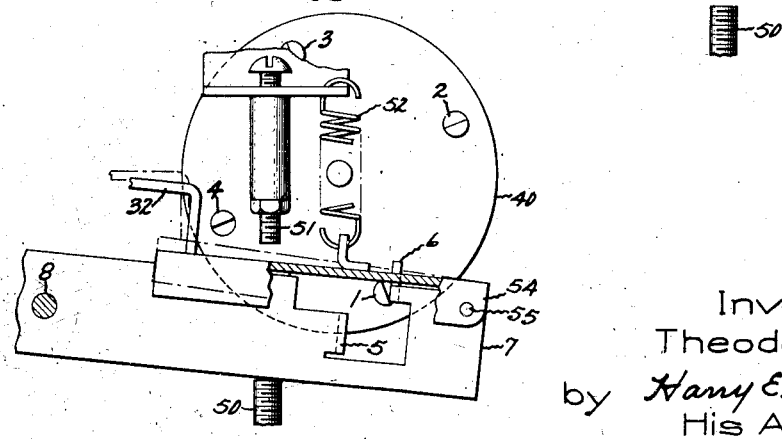
Inventor:
Theodore A. Rich,
by Harry E. Dunham
His Attorney.

Aug. 22, 1944.   T. A. RICH   2,356,616

PEAK DEMAND METER

Filed July 15, 1942   3 Sheets-Sheet 3

Inventor:
Theodore A. Rich,
by *Harry E. Dunham*
His Attorney.

Patented Aug. 22, 1944

2,356,616

UNITED STATES PATENT OFFICE 2,356,616

PEAK DEMAND METER

Theodore A. Rich, Schenectady, N. Y., assignor to General Electric Company, a corporation of New York Application July 15, 1942, Serial 450,976

8 Claims. (Cl. 171—34)

My invention relates to peak demand meters and concerns improvements in the general type of peak demand meter described in U. S. Patent 2,172,176 to George F. Gardner and myself. In particular the purpose of the present invention is a peak demand meter of high sensitivity and accuracy which is positive in operation and is largely immune to vibrations.

Figure 4:
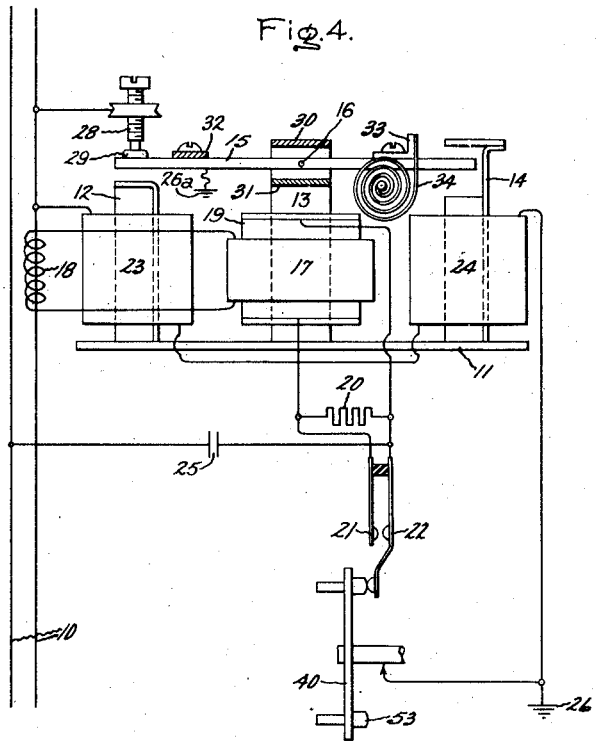
Figure 5:
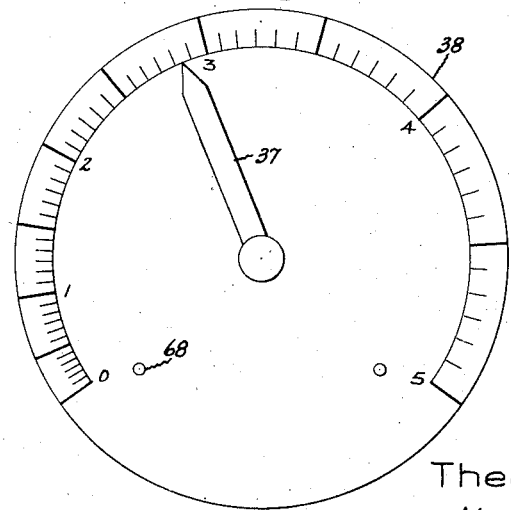

The features of my invention which are believed to be novel and patentable will be pointed out in the claims appended hereto. For a better understanding of my invention reference is made in the following description to the accompanying drawings in which Fig. 1 represents an exploded perspective view of my improved meter; Fig. 2 represents a side view partially in section of a commercial form of the meter; Fig. 3 shows the escapement as viewed from the rear in Fig. 1; Fig. 3a shows a rear view of the escapement in a different position; Fig. 4 shows the wiring diagram and Fig. 5 shows a preferred form of scale.

Referring now to Figs. 1 and 4, 10 represents a power circuit which is subject to heavy current loads of short duration such for example as occur in a welding circuit. The purpose of the meter is to measure the peak demand of such loads with high accuracy.

An important part of the meter is an electromagnet having a back yoke 11, three legs 12, 13 and 14, an armature 15 pivoted at 16 to the open end of the center leg 13. These electromagnet parts are of course made of magnetic material. The electromagnet has on its central leg 13 a coil 17 which is energized by or in proportion to the current flowing in line 10 and is shown connected across the secondary of a current transformer 18. Also on the central leg of the electromagnet is a coil 19 shown beneath coil 17. Coil 19 is a secondary or shading coil for primary coil 17 and is connected across a resistance 20 and contacts 21 and 22 and is completely short circuited when these contacts close. The two outer legs 12 and 14 of the electromagnet are provided with energizing coils 23 and 24 connected in series across line 10 or other suitable voltage source through a condenser 25. This connection is partially through the metal framework and structure of the meter. Thus, the connection from coil 24 to condenser 25 may be through the metal framework represented by a ground connection shown at 26, a metal escapement wheel 40, one of the contact buttons 53 thereon and contact member 22. When the armature 15 is in the open or detracted position shown in Figs. 1 and 4, the coils 23 and 24 are short circuited through a stationary contact 28 and a contact 29 on the armature. This short circuit path includes a grounded connection through the metal armature 15 and its pivots represented by ground connection 26 and 26a. Condenser 25 prevents excessive current flow through such short circuited connection when contacts 28 and 29 are closed. The purpose of this arrangement is so that current coil 17, when sufficiently energized, will start movement of armature 15 to attracted position. This increases the contact resistance between contacts 28 and 29, allowing some current to flow through voltage coils 23 and 24 which increases the pull on the armature completely separating contacts 28 and 29, thereby fully energizing coils 23 and 24, which then complete the pulling-in operation of the armature vigorously and with sufficient force to supply the necessary operating force for the operation of the meter as will be explained. Hence, current coil 17, when sufficiently energized, merely starts initial movement of the armature towards attracted position and coils 23 and 24 furnish the energy for the major actual pull-in operation of the armature and the operations which it performs when attracted.

It will be noted that the pole piece at the upper end of leg 12 is below and the pole piece at the upper end of leg 14 is above the armature so that the magnetic pull at these points is such as to turn the armature in the same direction, namely counterclockwise. The coils 23 and 24 are connected to produce flux in the same direction about the magnetic circuit formed by yoke 11, legs 12 and 14 and armature 15. It will be noted that the magnetic gap between the armature and the upper end of the central leg 13 is formed by magnetic pole piece parts 30 and 31 equally spaced from and above and below the armature at its pivot point. This double gap arrangement is important for two reasons. Its reluctance remains substantially constant for all rotative positions of the armature and the armature pivot friction does not change due to different flux values or armature positions. No armature operating magnetic pull occurs at such pivot gap. However, the flux crossing such gap is available at the gaps at the extremities of the armature to produce the initial magnetic pull which starts separation of contacts 28 and 29.

The armature 15 has a connection 32 for controlling an escapement device and a connection 33 to a spring 34 that is progressively tensioned by operation of the escapement device on the occurrence of progressively higher peak demands.

The power for tensioning spring 34 and operating the escapement device comes from a spring 35, the inner end of which is secured to a shaft 36 to which the inner end of spring 34 is also secured. Also, on shaft 36 is the pointer 37 of the meter and spring 35 is wound manually when the pointer 37 is set counterclockwise to the zero end of its scale 38. Preferably an adjustable coupling 39 is provided between springs 35 and 34 for the purpose of adjusting the initial tension of spring 34 and for calibration purposes.

The escapement wheel 40 is geared to shaft 36 through gears 41, 42, 43 and 44 such that the escapement wheel rotates at much higher speed than shaft 36. Gear 42 is loose on its shaft 45 but has a one way driving connection therewith through a disk 46 secured to shaft 45, a pawl 47 pivoted to disk 46 and a ratchet wheel 48 secured to gear 42. This permits the winding of spring 35 without operation of the escapement mechanism but requires the spring 35 to be unwound under control of the escapement.

Extending to the rear of escapement wheel 40, as shown in Fig. 1, are four pins 1, 2, 3 and 4, which cooperate with two forwardly extending stops 5 and 6 on an escapement lever 7 which is pivoted at 8. Fig. 3, which shows the relation of these parts as viewed from the rear of Fig. 1, will assist in an understanding of their operation. When the armature 15 and the attached escapement control finger 32 are up, the relation of the escapement parts are as shown in Fig. 3. At this time the operating end of finger 32 is spaced slightly above lever 7 such that armature 15 and 32 in moving to the energized position do not encounter any resistance from the escapement lever 7 until the armature has gained momentum and is subject to the attractive force of fully energized coils 23 and 24. Hence, the downward movement of finger 32 against lever 7 is positive and forceful and moves the lever downward to the position shown in Fig. 3a against a stop 50. The upper position of lever 7 is determined by a stop 51 and these stops are adjustable. Lever 7 is biased to its upper position by a spring 52.

As indicated in Fig. 3, I prefer to make lever 7 in two parts by pivoting a small inertia part 54 to lever 7 at 55 and interpose such part 54 between the lever 7 and finger 32. Spring 52 and stop 51 also act on the pivoted part 54 rather than directly on lever 7. During a ratcheting operation when finger 32 moves downward, part 54 and 7 move downward together. However, when these parts move upward small inertia part 54 moves upward ahead of lever 7 as indicated in dotted lines in Fig. 3a until part 54 is stopped by stop 51 followed more slowly by heavier lever 7. Spring 52 thus serves to assist the quick return of finger 32 and the armature 15 to which it is attached, whereby the armature contacts at 28 and 29 are closed before the ratchet wheel 40 has completed its one-quarter revolution advance hereinafter described. When part 54 strikes stop 51 lever action helps to pull arm 7 upward.

Escape wheel 40 is urged to turn in a counter-clockwise direction as viewed from the rear in Fig. 3 by the spring 35. When lever 7 is up the lowermost pin 1 projecting from the rear of the escapement wheel 40 rests against stop 5. When the lever 7 is forced downward, Fig. 3a, stop 5 releases pin 1 and allows it to advance until it strikes stop 6 which is lowered to engaging position with lever 7 as indicated. When the lever 7 is again raised, pin 1 is released by stop 6 and moves to the position of pin 2, while pin 4 moves to the lowermost position against stop 5. Thus, each time the lever 7 is lowered and raised, wheel 40 advances one-quarter revolution.

To the front of escapement wheel 40 project four contact buttons 53 which cooperate with resilient contact member 22. When armature 15 is in detracted position and escapement wheel 40 is stopped by stop 5, one of the contact buttons 53 engages contact member 22 and moves it forward away from the wheel slightly and also from engagement with contact member 21. Hence under this condition resistance 20 is included in the circuit of shading coil 19 and the grounded side of voltage coil 24 is connected through wheel 40, one of the contact buttons 53, contact member 22 and condenser 25 to the line. Resistance 20 is relatively high and is included to improve the response of the instrument as will be hereinafter described. The voltage coils 23 and 24 are short circuited through contacts 28 and 29 until they start to separate. When sufficient line current flows in coil 17 to start separation of contacts 28 and 29, current starts to flow in coils 23 and 24 to completely separate the contacts 28 and 29 and operate the armature to attracted position. Immediately thereafter escapement wheel 40 advances to the position indicated in Fig. 3a and the contact button 53 moves from under contact member 22 and opens the circuit of voltage coils 23 and 24 and closes the short circuit across resistance 20 at contacts 21 and 22. The flux produced by current coil 17 in the central leg 13 of the electromagnet collapses due to the short circuit of secondary coil 19 and also the flux produced by voltage coils 23 and 24 ceases. Hence armature 15 returns to detracted position followed by the lifting of lever 7 and wheel 40 advances to again close the energizing connection for coils 23 and 24 and remove the short circuit of secondary coil 19 between contacts 21 and 22 but not until after contacts 28 and 29 have closed to short circuit coils 23 and 24. This action is repeated so long as the flux produced by current coil 17 is sufficient to start separation of contacts 28 and 29.

However, at each one-quarter revolution advance of escapement wheel 40, pointer 37 is moved up-scale and spring 34 is tensioned by a proportional amount. The tensioning of spring 34 is applied to the armature 15 through extension 33 in such a direction as to oppose attraction of the armature and hence it requires a progressively greater current in coil 17 to start separation of contacts 28 and 29 after each escapement and spring tensioning operation.

It will be noted that the entire assembly thus far described is pivoted on a horizontal axis at pivots at 56 and 57. This axis is parallel with and preferably coaxial with the axis of rotation of armature 15. That is, straps 58 and 59 support the framework 60 on which all of the parts thus far described are carried such that the framework 60 can rock or pivot about a horizontal axis through pivots 56 and 57. The framework 60 and parts carried thereby are balanced by weight 63 with the center of gravity below the pivots so that it normally rests in the horizontal position shown. Cushioning bumpers at 61 and 62 slightly below the frame 60 prevent any large turning movement of the framework about such pivoted axis. The purpose of this arrangement is to make the operation of the apparatus, particularly the initial movement of armature 15, immune from vibration.

As a result of the various expedients described, the initial movement of armature 15 is extremely sensitive and accurately responsive to the relation between the maximum current flow in line 19 and the countertorque of spring 34 over the entire scale range of operation of the peak demand meter regardless of the duration of the current peaks.

The magnitude of the peak current flow in coil 17 and the resulting flux merely controls and is not depended upon to do the operating work of the meter. In fact, a complete ratcheting advance of escapement wheel 40 may take a very considerably longer period of time than the duration of the peak current which initiates such operation. All that is required of the peak current flux is to move armature 15 enough to increase the contact resistance between contacts 28 and 29. Such movement is too small to be visible but if it occurs, current flows through operating coils 23 and 24, thereby completing the separation of the contacts which increases the operating current through coils 23 and 24 and supplies the operating energy to pull armature 15 to attracted position with considerable force. The initial current peak may last only for a fraction of a cycle and may cease before contacts 28 and 29 are fully separated without failure of the voltage flux to complete the operation. At the same time, if the peak current flux is not sufficient to overcome the pull of spring 34 it will not start separation of contacts 28 and 29 even though the peak current may last several cycles.

It was found that without the resistance 20 an impulse of one cycle duration required about 5% greater current to start movement of armature 15 than an impulse of greater length. This difference was greatest at one cycle and became less until at 10 cycles and above no difference was noted. Shunting resistance 20 across the secondary shorting coil 19 corrected this error so that the peak operating current through coil 17 is now independent of the number of cycles duration of such peak. Condenser 25 which is in series with the operating coils tunes the circuit and also permits of short circuiting such operating coils without drawing excessive current. Low inertia part 54 of the escapement lever 7 assures that the operating coils will be short circuited at contacts 28—29 before such coils are connected across the line through condenser 25 at the end of an escapement wheel advancing operation. The pivoted arrangement of the mechanism prevents vibrations from inadvertently varying the contact resistance at contacts 28—29. The spacing of the pivot of armature 15 between pole pieces 30 and 31 reduces friction at such pivot. All of these factors contribute to the sensitivity and high accuracy of the device for the purpose for which intended.

Hence while the meter is for the same purpose and performs in a manner generally similar to that of the meter of Patent 2,172,176, it has a very much higher accuracy and sensitivity due to the various improvement features described.

As shown in Fig. 2, the commercial form of the improved meter can be made sufficiently compact as to be enclosed in a standard form of single phase watthour meter casing 63 having a glass cover 64 and I may use a usual form of manual resetting device 65 extending through the front glass cover of the meter with facilities 66 for sealing the operating crank 67 thereof against unauthorized use.

The meter is reset in the usual way by unsealing crank 67, pulling it out of the slot in the sealing part 66 and rotating it with arm 65 in a counterclockwise direction to move pointer 37 down scale to the desired position. Crank arm 65 is then moved to the out-of-the-way position shown and sealed in such position. Moving pointer 37 down scale winds spring 35 and unwinds spring 34. The scale length for the meter may be of the order of 300 degrees without any difficulty as indicated in Fig. 5.

For calibration purposes the initial tension of spring 34 may be adjusted by coupling 39. Contact 28 is preferably adjustable as are also stops 50 and 51 and spring tension 52.

The device is preferably so calibrated that the pointer 37 will move up scale a short distance from the zero stop 68, Fig. 5, with only the voltage operating circuit energized until the tension of spring 34 is increased to a value to hold contacts 28 and 29 closed when no current flows in coil 17. This pointer position may be considered the zero position of the scale. If, now, a low value, steady state current flows in coil 17, the device will operate to move pointer 37 further up scale until the tension of spring 34 again holds contacts 28 and 29 closed. Subsequent higher current surges through initialing coil 17 will cause movement of the pointer further up scale, etc., such that it indicates the maximum surge current value which has occurred since the pointer was last reset. The device will respond to either surges or steady state current values with equal facility and accuracy, but of course a surge corresponding to a value considerably higher than that indicated which is of such short duration that it does not allow the mechanism time enough for repeated operations up to the corresponding value of the surge will not be fully recorded but this is considered to be an advantage rather than a disadvantage because it is not desirable to unduly penalize a customer for a very occasional high surge of momentary duration. Of course, if such a surge is repeated several times during a meter reading period, it will eventually be fully recorded.

What I claim as new and desire to secure by Letters Patent of the United States is:

1. A peak current demand meter comprising an electromagnet, an armature therefor, a first spring for biasing said armature to detracted position, a current coil on the electromagnet energized in accordance with the variable load current of the circuit to be metered, a secondary coil on the electromagnet in secondary transformer relation with respect to the current coil, a resistance connected across said secondary coil, a voltage winding on the electromagnet, an energizing circuit therefor, said current coil and voltage winding when energized both producing fluxes which tend to move the armature from detracted to attracted position against the bias of said spring, contacts for short circuiting the voltage winding only when the armature is in detracted position, a pointer, a second spring for advancing said pointer, an escapement device controlled by the operation of said armature for allowing a limited predetermined advance of said pointer for each movement of the armature to and from attracted position, such pointer advancing operations progressively tensioning the first spring, and contacts operated by said escapement during each pointer advancing operation for momentarily short circuiting said resistance and opening the energizing circuit of the voltage winding to allow the return of the armature to detracted position.

2. In a demand meter an electromagnet having an E-shaped core with an armature pivoted at the outer end of the middle leg on an axis at right angles to such middle leg and extending between the outer legs, said middle leg having flux carrying pole piece parts spaced from the armature on opposite sides of its axis of rotation so that magnetic attraction force between the armature and middle leg is equalized with respect to the armature pivot in all armature positions whereby armature pivot friction is not increased by reason of such attraction, the outer legs having pole piece parts facing opposite sides of the armature so that the attractive force at opposite ends of the armature produces rotation of the armature on its pivot in the same direction.

3. In a peak demand meter an alternating current electromagnet having an E-shaped core with a movable armature pivoted at the outer end of the middle leg and extending between the outer legs, means for biasing said armature to detracted position, a peak current coil on the middle leg energized in response to current surges to be measured for overcoming said bias sufficiently to start initial movement of the armature to attracted position, a voltage winding on the outer legs of the core which when energized completes the movement of the armature to attracted position, contacts for short circuiting the voltage winding only when the armature is in detracted position, a secondary transformer winding also on the middle leg of the core and a resistance connected in series with the secondary winding, said secondary transformer circuit having such constants as to cause the initial armature attractive force produced by the flux of the peak current coil to be substantially independent of the duration of the current surges therethrough.

4. A peak current demand meter comprising an electromagnet, a pivoted armature therefor, movable between attracted and detracted positions, a first spring for biasing said armature to detracted position, a current coil on the electromagnet energized in accordance with the variable load current to be metered, a secondary coil on the electromagnet in transformer relation with respect to the current coil used as a primary, a resistance connected across the secondary coil, a voltage winding on the electromagnet, an energizing circuit therefor including a current limiting and tuning condenser, said current coil when sufficiently energized serving to start and the voltage winding when energized serving to complete movement of the armature from detracted to attracted position against the bias of said spring, means for short circuiting the voltage winding only when the armature is in detracted position, a pointer, a second spring for advancing said pointer and increasing the tension of the first spring as the pointer is advanced to increase the bias on said armature, an escapement device controlled by the operation of the armature for allowing a limited predetermined advance of the pointer each time the armature is moved to and from attracted position and contacts operated by the escapement during each pointer advancing operation thereof for short circuiting said resistance and opening the energizing circuit of the voltage winding for a sufficient length of time to allow the armature to return to detracted position.

5. In a peak demand meter, a pointer which is advanced in accordance with peak current demand, a spring for advancing the same, an escapement for controlling such advance, a pivoted escapement lever movable between stops for controlling the escapement, the lever having a complete cycle of movement for each advance of the escapement, an electromagnet for moving said lever in one direction to initiate an escapement advancing operation, a second spring to move said lever in the opposite direction to complete the escapement advancing operation, said electromagnet having an armature pivoted to move between detracted and attracted positions and engageable with said lever when moved toward the attracted position, a third spring for biasing said armature to detracted position, the third spring being tensioned by the first spring when the pointer is advanced, a current coil on the electromagnet energized in response to the current to be metered for overcoming the bias of said third spring to start movement of the armature from its detracted position, a voltage winding on the electromagnet which, when energized, completes the movement of said armature to attracted position, an energizing circuit for the voltage winding, means for short circuiting said voltage winding only when the armature is in detracted position, and means operated by the escapement during an advancing operation for rendering said electromagnet ineffective to further attract said armature until the armature has been returned to detracted postion, said lever having a low inertia hinged part in operative relation with said second spring and armature which allows for and assists the quick return of said armature to detracted position.

6. A demand meter having an electromagnet provided with a pivoted armature which is movable between detracted and attracted positions, winding means for said electromagnet for moving said armature from detracted to attracted position in response to predetermined current values to be metered, a spring for biasing said armature to detracted position, means for varying the tension of said spring to vary the current value to which the electromagnet responds, a casing for said meter, said meter being pivotally supported within said casing on an axis of rotation above the center of gravity of the meter and parallel to and substantially coaxial with the axis of rotation of said armature to decrease the effect of vibration on the operation of the armature.

7. A peak current demand meter comprising a pointer, a gear train connected thereto, a spring for advancing said gear train and pointer, an escapement for controlling the advance of the gear train, an electromagnet provided with a movable armature for controlling the escapement, said electromagnet having two energizing windings, one of which is energized in response to the current to be metered for producing a minor initial attractive movement of the armature and the other of which is energized in response to such movement to complete the major part of the attractive movement of said armature, whereby the forces required for the advance of the gear train and pointer and the control of the escapement are merely controlled by the winding which is energized in response to the current to be metered.

8. A peak current demand meter comprising a pointer, a gear train connected thereto, an escapement for said gear train, a spring for advancing said gear train and pointer under the control of said escapement, an electromagnet provided with a pivoted armature which when moved from detracted to attracted position and return, controls the operation of said escapement, said armature having an initial minor free range of movement from detracted position, a control winding on said electromagnet energized in response to the current to be metered for producing an initial free minor attractive movement of the armature, an energizing winding on said electromagnet which is energized in response to such initial free minor attractive movement of the armature for producing a major and final attractive movement of the armature and the control of said escapement, spring means associated with the escapement tensioned by the major attractive armature movement to assist in returning the armature to detracted position, means responsive to the resulting operation of said escapement and corresponding advance of said gear train for interrupting the attractive force produced by both of said windings to allow the armature to return to detracted position and a spring tensioned by the advance of said pointer for biasing the armature to detracted position, the arrangement being such that the control winding merely controls the operation of said meter.

THEODORE A. RICH.